United States Patent
Werdell et al.

(10) Patent No.: US 11,528,240 B2
(45) Date of Patent: Dec. 13, 2022

(54) REAL-TIME INTEGRATION OF MACHINE INTELLIGENCE INTO CLIENT MESSAGING PLATFORMS

(71) Applicant: T-Mobile USA, Inc., Bellevue, WA (US)

(72) Inventors: Joel Werdell, Seattle, WA (US); James Ellison, Issaquah, WA (US); Robert Stamm, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/473,598

(22) Filed: Sep. 13, 2021

(65) Prior Publication Data
US 2021/0409360 A1 Dec. 30, 2021

Related U.S. Application Data

(63) Continuation of application No. 15/393,087, filed on Dec. 28, 2016, now Pat. No. 11,153,236.

(51) Int. Cl.
*G06F 15/16* (2006.01)
*H04L 51/046* (2022.01)
(Continued)

(52) U.S. Cl.
CPC ............ *H04L 51/046* (2013.01); *H04L 51/02* (2013.01); *H04L 51/214* (2022.05); *H04L 67/141* (2013.01); *H04W 4/14* (2013.01)

(58) Field of Classification Search
CPC ....... H04L 51/046; H04L 51/02; H04L 51/14; H04L 67/141; H04W 4/14
See application file for complete search history.

(56) References Cited

U.S. PATENT DOCUMENTS 7,555,148 B1    6/2009  Steinberg et al.
8,249,582 B1 *  8/2012  Abou-El-Ella ......... H04M 1/56
                                                      455/418

(Continued)

OTHER PUBLICATIONS

International Application No. PCT/US2017/067735, International Search Report and Written Opinion dated Apr. 17, 2018, 15 pages.

(Continued)

*Primary Examiner* — Chris Parry
*Assistant Examiner* — Dixon F Dabipi
(74) *Attorney, Agent, or Firm* — Han Santos, PLLC

(57) ABSTRACT

This disclosure describes techniques that facilitate selectively automating a response to a client request for vendor services based on an intended meaning of the client request, a category of vendor services associated with the client request, and one or more factors such as an urgency index and a health index. The vendor services system may parse audio, text, and image data of a client request to determine an intended meaning. In some examples, the vendor services system may automate a response that resolves the client request, or automate a response that requests additional information from the client device. Alternatively, or additionally, the vendor services system may direct the client request to a vendor representative for further processing. In doing so, the vendor services system may monitor dialogue between the client and vendor representative, and selectively provide the vendor representative with support data that may help resolve the client request.

15 Claims, 8 Drawing Sheets

(51) Int. Cl.
*H04L 51/02* (2022.01)
*H04L 67/141* (2022.01)
*H04W 4/14* (2009.01)
*H04L 51/214* (2022.01)

(56) References Cited

U.S. PATENT DOCUMENTS

| | | | |
|---|---|---|---|
| 8,594,304 B2 | 11/2013 | Werth et al. | |
| 8,601,131 B1* | 12/2013 | Wood | G06F 15/17331 709/227 |
| 8,984,143 B2* | 3/2015 | Serra | H04M 3/5116 709/200 |
| 9,077,699 B1* | 7/2015 | James | H04L 51/046 |
| 2005/0097224 A1 | 5/2005 | Chen et al. | |
| 2006/0153356 A1 | 7/2006 | Sisselman et al. | |
| 2006/0262352 A1 | 11/2006 | Hull et al. | |
| 2007/0123222 A1 | 5/2007 | Cox et al. | |
| 2008/0075049 A1 | 3/2008 | Xie | |
| 2008/0183852 A1* | 7/2008 | Pramer | G06Q 30/02 709/227 |
| 2009/0086688 A1 | 4/2009 | Kvache et al. | |
| 2009/0198652 A1* | 8/2009 | Guy | G06Q 10/00 |
| 2011/0022641 A1* | 1/2011 | Werth | H04L 67/125 707/E17.044 |
| 2013/0103749 A1* | 4/2013 | Werth | H04L 41/0816 709/203 |
| 2013/0124189 A1 | 5/2013 | Baldwin | |
| 2013/0305379 A1 | 11/2013 | Udani | |
| 2014/0188729 A1* | 7/2014 | Hong | H04L 41/0686 709/224 |
| 2015/0289152 A1 | 10/2015 | Shanmugam et al. | |
| 2015/0350444 A1 | 12/2015 | Glass et al. | |
| 2016/0027399 A1* | 1/2016 | Wilde | H04L 65/1083 345/520 |
| 2016/0080248 A1* | 3/2016 | Rijnders | H04W 4/70 709/224 |
| 2016/0225372 A1* | 8/2016 | Cheung | G06F 3/167 |
| 2016/0335252 A1* | 11/2016 | Brunet | G06Q 30/0278 |
| 2017/0324785 A1 | 11/2017 | Taine et al. | |

OTHER PUBLICATIONS

U.S. Appl. No. 15/393,087, Final Office Action dated Jun. 25, 2020, 75 pages.
U.S. Appl. No. 15/393,087, Non Final Office Action dated Jan. 9, 2020, 57 pages.
U.S. Appl. No. 15/393,087, Non Final Office Action dated Dec. 15, 2020, 87 pages.
U.S. Appl. No. 15/393,087, Non Final Office Action dated Oct. 18, 2021, 41 pages.
U.S. Appl. No. 15/393,087, Notice of Allowance dated Jul. 6, 2021, 47 pages.
U.S. Appl. No. 15/393,897, Non Final Office Action dated Apr. 30, 2019, 45 pages.

* cited by examiner

REAL-TIME INTEGRATION OF MACHINE INTELLIGENCE INTO CLIENT MESSAGING PLATFORMS

CROSS-REFERENCE TO RELATED APPLICATION

This application is a continuation of U.S. application Ser. No. 15/393,087, filed Dec. 28, 2016, which is incorporated by reference.

BACKGROUND

Vendors that offer vendor services to clients, such as telecommunications services, may combine their offerings with vendor support services that help clients resolve substantive issues. In one example, a client of a telecommunications service may seek technical support services to resolve functionality issues of a client telecommunications device.

However, as vendor services become more widespread and sophisticated, vendor representatives may be tasked with tackling an increasing volume and variety of client requests. In doing so, a vendor representative may develop separate workflows for each client request without having the benefit of baseline support data that is either known to the client or vendor. Thus, the vendor representative may be tasked with engaging each client to recount such data. This process may frustrate a client seeking support, which may in turn burden a vendor representative with an additional task of improving client sentiment towards vendor services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
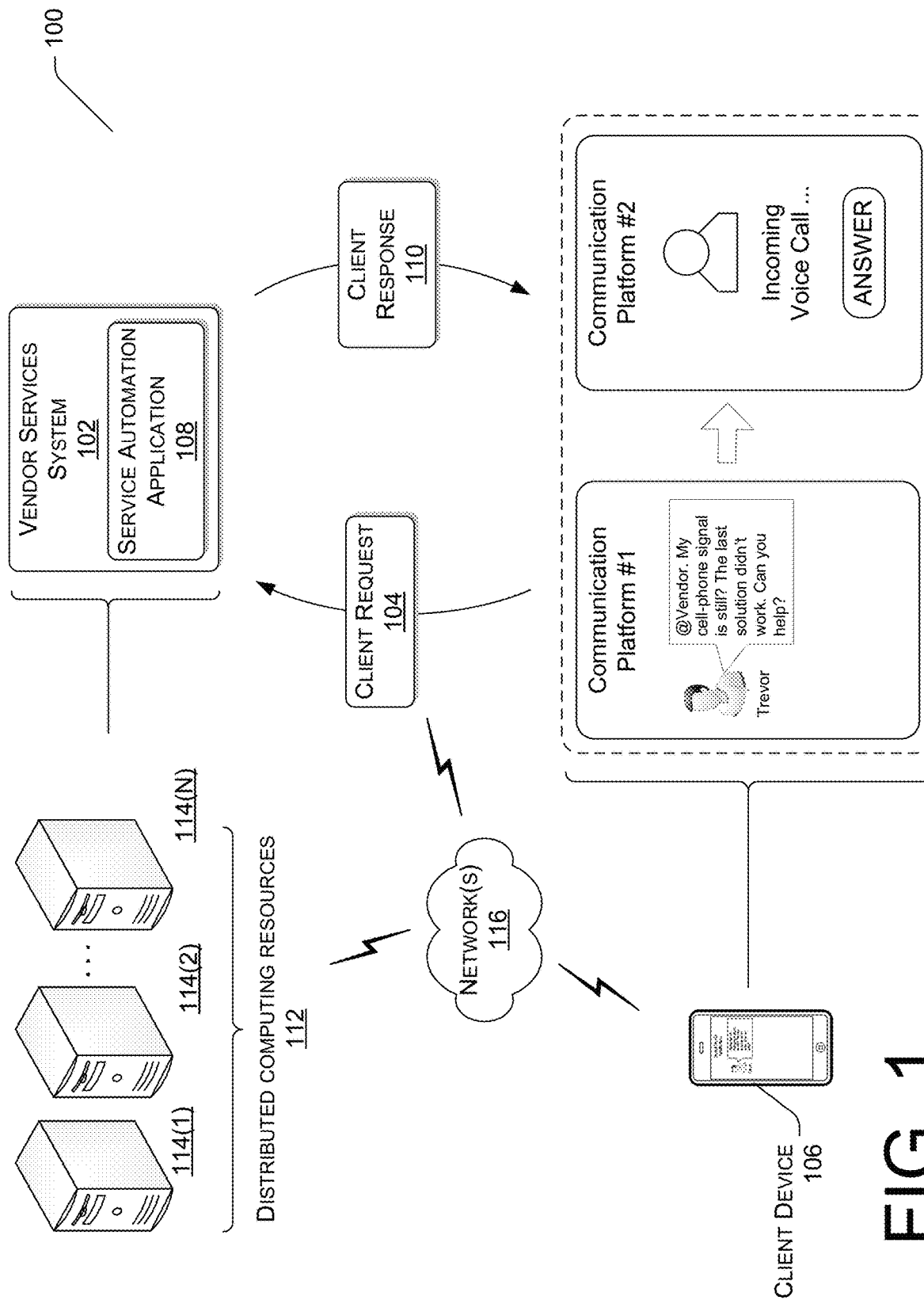
FIG. 1 illustrates a schematic view of a computing environment that facilitates selectively automating a response to a client request for vendor services.

This disclosure describes techniques that facilitate selectively automating a response to a client request for vendor services. Vendor services may relate to provisioning of services, such as telecommunication services, or a sale of any goods via an electronic marketplace. Vendor services may include technical service support, client account service support, vendor service support, and marketing service support. For example, a vendor that provisions telecommunication services may receive a client request for vendor service support relating telecommunication network performance. Alternatively, or additionally, a vendor of telecommunication services may receive a client request for marketing service support for an advertised sale of a client device.

In some examples, the techniques described herein may be implemented via a vendor services system. The vendor services system may receive a client request, and in doing so execute probabilistic machine learning algorithms that automate a response to the client request, or direct the client request to a vendor representative for further processing. In these instances, the vendor services system may generate user efficiencies by automating a response to a client request, and streamlining others that would typically require extensive client interaction. This may in turn reduce an overall volume of communications typically associated with resolving a client request. Further, a reduction in the volume of communications may translate into a network bandwidth efficiency on the vendor platform.

In the illustrated example, the vendor services system may operate on a vendor platform that authenticates a client device prior to, or in conjunction with receipt of a client request. In some examples, an authentication of a client device may be based at least in part on data within the client request. Further, the vendor services system may associate a client account with the client device and in turn, access client profile data from the client account that may be relevant to a client response.

In some examples, the vendor services system may receive a client request via a communication platform such as, but not limited to, an email service, an audio-telecommunications service, a short messaging service (SMS), a multimedia messaging service (MMS), a rich communication service (RCS), or a social media messaging service. Moreover, the vendor services system may parse audio data, text data, and image data associated with the client request to determine a literal and intended meaning of the client request, and a category of vendor services associated with the client request. The category of vendor services may include, but are not limited to, technical service support, client account service support, vendor service support, and marketing service support.

The vendor services system may generate a client response to a client request based at least in part on an intended meaning of the client request, the category of vendor services associated with the client request, and one or more factors such as an urgency index, a health index, or a combination of both. The client response may include an automated response that resolves the client request, an automated response that requests additional information from the client device, or a combination of both. Additionally, or alternatively, the vendor services system may direct the client request to a vendor representative for further processing. In this instance, the vendor services system may monitor dialogue between the client and vendor representative, and provide the vendor representative with support data that may help resolve the client request. For example, a vendor services system may determine that dialogue between the client and vendor representative concerns functionality of the client device at a specific geographic location. Thus, the vendor services system may remotely initiate a diagnostic test on the client device and provide the vendor representative with corresponding results data.

In various examples, the client response may be delivered via a same communication platform in which the client request was received. Alternatively, the client response may be delivered via an alternate communication platform that is based on an indication of a communication preference, an urgency index, a health index, or any combination thereof.

The communication preference may be based on an indication of a preferred communication platform indicated within a client profile of a client account. The urgency index and the health index, as described in more detail below, each comprise of normalized numerical values that reflect an incremental grade of urgency and health, respectively. For example, the urgency index may reflect an incremental grade of an urgency associated with a client request, and may vary from non-urgent and non-service critical through to urgent and service critical. Further, the health index may reflect an incremental grade of an overall client experience with vendor services, and may vary from unsatisfied with unresolved issues through to satisfied with no unresolved issues.

The health index may take into account several key parameters, such as a sentiment index, credit index, he, and a vendor service index. The sentiment index may reflect an incremental grade of a client's general view or attitude towards a vendor service. In some instances, the sentiment index may numerically represent an attitude that a vendor representative is likely to encounter through a client interaction. The credit index may reflect a client creditworthiness, both generally and with respect to the vendor.

Further, the device health index may reflect an integrity of a client device that facilitates delivery of vendor services. For example, the device health index may numerically represent the integrity of a client, mobile telecommunication device that delivers vendor telecommunication services. Further, the device health index may be based at least in part on the results of diagnostic tests performed on the client device.

Additionally, the vendor service index may numerically capture the reliability and quality of vendor services as experienced by a client. The vendor service index may be based on data from the vendor services system, the client device, or a combination of both. For example, the vendor services system may remotely initiate diagnostic tests on a client device. The diagnostic test may quantify a capability of the client device to deliver vendor services.

The techniques described herein may be implemented in a number of contexts. Several example implementations and context are provided with reference to the following figures. Further, the term "techniques," as used herein, may refer to system(s), method(s), computer-readable instruction(s), module(s)m algorithms, hardware logic, and/or operation(s) as permitted by the context described above and throughout the document.

FIG. 1 illustrates a schematic view of a computing environment 100 that facilitates selectively automating a response to a client request for vendor services. Particularly, a vendor services system 102 may receive a client request 104, and in doing so execute probabilistic machine learning algorithms that automate a response to the client request 104, or direct the client request 104 to a vendor representative for further processing. In some instances, the vendor services system 102 may monitor a client interaction with a vendor representative, and selectively provide the vendor representative with support data that may help resolve the client request 104.

In the illustrated example, a client may submit a client request 104 to a vendor services system 102. The vendor services system 102 may operate on a vendor platform that authenticates the client device 106. In some examples, the vendor platform may authenticate the client device 106 prior to, or in conjunction with, receipt of the client request 104. The vendor services system 102 may receive the client request 104 via one of an audio-telecommunications service, an email service, a short messaging service (SMS) platform, a multimedia messaging service (MMS) platform, a rich communication service (RCS) platform, a social media messaging platform.

Further, the vendor services system 102, via a service automation application 108, may parse audio data and text data of the client request 104 to determine an intended meaning of the client request 104, and ultimately generate a client response 110. In some examples, the client response 110 may be an automated response that resolves the client request 104, or requests additional data. Alternatively, or additionally, the client response 110 may constitute initiating a client interaction with a vendor representative for further processing. In the illustrated example, the client device 106 may transmit a client request 104 via a text-based communication platform, and in response, receive an incoming voice-call from a vendor representative, via an audio-based communication platform.

Moreover, the vendor services system 102 may operate on one or more distributed computing resource(s) 112. The one or more distributed computing resource(s) 112 may include one or more computing device(s) 114(1)-114(N) that operate in a cluster or other configuration to share resources, balance load, increase performance, provide fail-over support or redundancy, or for other purposes. The one or more computing device(s) 114(1)-114(N) may include one or more interfaces to enable communications with other networked devices, such as the client device 106, via one or more network(s) 116. Further, the one or more network(s) 116 may include public networks such as the Internet, private networks such as an institutional and/or personal intranet, or some combination of private and public networks. The one or more network(s) 116 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Furthermore, the client device 106 may include any sort of electronic device, such as a cellular phone, a smart phone, a tablet computer, an electronic reader, a media player, a gaming device, a personal computer (PC), a laptop computer, etc. The client device 106 may have a subscriber identity module (SIM), such as an eSIM, to identify the client device 106 to a telecommunication service provider network (also preferred to herein as "telecommunication network").

Figure 2:
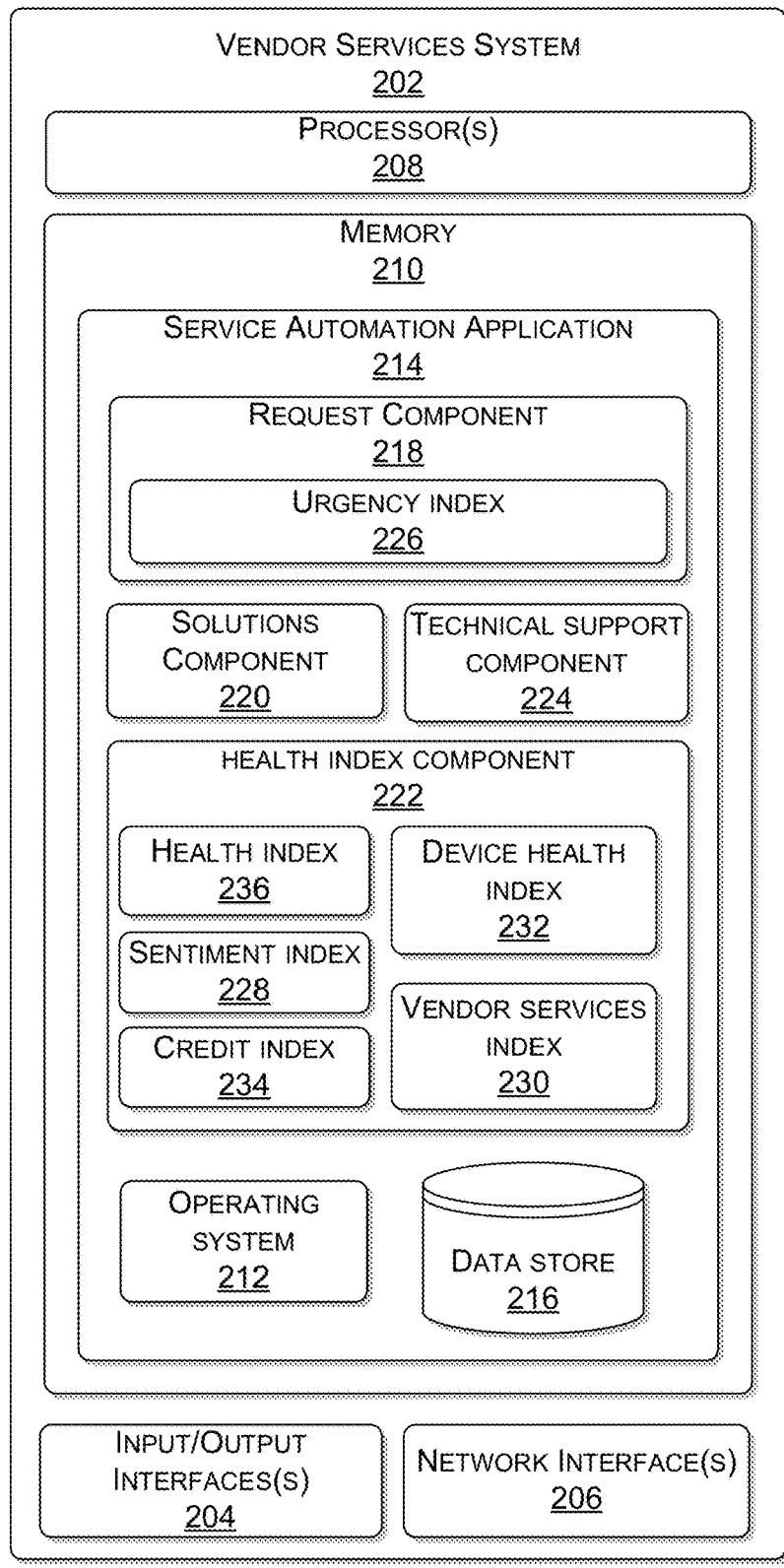
FIG. 2 illustrates a block diagram of a vendor services system that may selectively automate a response to a client request for vendor services.

FIG. 2 illustrates a block diagram of a vendor services system 202 that may selectively automate a response to a client request for vendor services. Particularly, the vendor services system 202 may execute probabilistic machine learning algorithms that automate a response to a client request based on an availability of support data needed to fulfill the client request. In other examples, the vendor services system may automate a communication to a client device that initiated the client request, requesting support data. Alternatively, or additionally, the vendor services system may direct a client request to a vendor representative for further processing.

In the illustrated example, the vendor services system 202 may correspond to the vendor services system 102. Further, the vendor services system 202 may include input/output interface(s) 204. The input/output interface(s) 204 may include any type of output interface known in the art, such as a display (e.g. a liquid crystal display), speakers, a vibrating mechanism, or a tactile feedback mechanism. Input/output interface(s) 204 also include ports for one or more peripheral devices, such as headphones, peripheral speakers, or a peripheral display. Further, the input/output interface(s) 204 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the vendor services system 202 may include network interface(s) 206. The network interface(s) 206 may include any sort of transceiver known in the art. For example, the network interface(s) 206 may include a radio transceiver that performs the function of transmitting and receiving radio frequency communications via an antenna. In addition, the network interface(s) 206 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 206 may include wired communication components, such as an Ethernet port or a Universal Serial Bus (USB).

Further, the vendor services system 202 may include one or more processor(s) 208 that are operably connected to memory 210. In at least one example, the one or more processor(s) 208 may be a central processing unit(s) (CPU), graphics processing unit(s) (GPU), a both a CPU and GPU, or any other sort of processing unit(s). Each of the one or more processor(s) 208 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 208 may also be responsible for executing all computer applications stored in the memory, which can be associated with common types of volatile (RAM) and/or nonvolatile (ROM) memory.

In some examples, memory 210 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 210 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 210 may include an operating system 212, a service automation application 214, and a data store 216. The operating system 212 may be used to implement the service automation application 214. The operating system 212 may be any operating system capable of managing computer hardware and software resources. The service automation application 214 may include routines, program instructions, objects, and/or data structures that perform particular tasks or implement particular abstract data types.

The service automation application 214 may include a request component 218, a solutions component 220, a health index component 222, and a technical support component 224. The request component 218 may receive and process a client request for vendor services. In doing so, the request component 218 may identify a category of vendor services associated with the client request, an intended meaning of client request, and an urgency associated with the request.

The client request may comprise of audio data, text data, image data, or any combination thereof, that is sent towards the vendor platform. In some examples, the vendor platform may authenticate a client device that initiates the client request. In doing so, the vendor platform may identify a client account within the vendor platform that is associated with the client request.

In some examples, the vendor platform may authenticate the client device prior to, or in conjunction with, the request component 218 receiving the client request. In other examples, the client request may include a client identifier or client device identifier that authenticates the client device to the vendor platform. Further, the vendor platform may receive the client request via one of an email service, a short messaging service (SMS), a multimedia messaging service (MMS) platform, a rich communication service (RCS) platform, or a social media messaging platform.

In some examples, the request component 218 may parse audio data and text data of a client request via natural language processing (NLP) and natural language understanding (NLU) algorithms to determine a literal and intended meaning of the client request. In doing so, the request component 218 may determine an intended category of vendor services associated with the client request. In some examples, category of vendor services may include, but is not limited to, technical service support, client account service support, vendor service support, or marketing service support.

Additionally, the request component 218 may parse image data of a client request by extracting feature representations of the image data and determining similarities with a dataset of stored images within the data store 216. A comparison of feature representations between the image data and a dataset of stored images may be performed by a probabilistic machine learning algorithm. In some examples, the request component 218 may identify a dominant object within the image data. The dominant object may be extracted from the image data using any known object recognition method that identifies patterns and regularities in image data. The term "object" as used herein describes tangible entities that can be depicted in an image, such as an electronic device, a person, an automobile, or a fixed structure such as a network communications tower.

The request component 218 may determine a similarity between the dominant object of the image data and a stored image. The similarity can be determined by measuring the Euclid distance between feature representations of the dominant object and the stored image. In response to determining that the similarity between the dominant object and the stored image is greater than a predetermined threshold, metadata describing the stored image may be associated with the dominant object of the image data. For example, the stored image may be of a network communications tower, and may include metadata describing it as such. Thus, in response to determining that the dominant object of the image data is similar to the stored image, the dominant object may be tagged with the same metadata description of a "network communications tower."

Further, the request component 218 may generate an urgency index 226 to reflect an urgency of a client request. The urgency index 226 may comprise of a numerical value that is based on a predetermined scale of values. Each value may reflect an incremental grade of urgency, varying from non-urgent and non-service critical, through to urgent and service critical. In some examples, the intended meaning of a client request, as derived by NLP and NLU algorithms may be used to quantify the urgency index 226. Additionally, or alternatively, other factors such as the sentiment index 228 and the vendor services index 230, as determined by the health index component 222, may help determine the urgency index 226. In a non-limiting example, an analysis of a client request may suggest that the request is non-urgent and non-service critical. However, the sentiment index 228 associated with the client may suggest that a current view or attitude towards vendor services is negative. Further, a vendor services index 230 may suggest that the client has experienced poor service quality and reliability. Thus, the request component 218 may assign an urgency index 226 that reflects an urgent and service critical client request. Moreover, the request component 218 may use other factors to influence the numerical value of the urgency index 226. For example, a device health index 232 may suggest that a client device is unable to facilitate delivery of vendor services. Thus, the request component 218 may assign an urgency index 226 that reflects a service critical client request.

In another non-limiting example, the request component 218 may determine that a client request is associated with client account services support. The credit index 234 associated with the client may suggest that the client has a history of late payments. Thus, the request component 218 may assign an urgency index 226 that reflects an urgent client request.

Thus, in response to parsing a client request and determining a numerical value of an urgency index 226, the request component 218 may generate request data that includes, but is not limited to, an intended category of vendor services associated with the client request, an intended meaning of the client request, an urgency index 226 that reflects an urgency of the client request, and an indication of a client account within the vendor platform that is associated with the client request.

In the illustrated example, the service automation application 214 may include a health index component 222. The health index component 222 may generate a health index 236 that is intended to capture an overall client experience with vendor services. The health index may comprise of a numerical value that is based on a predetermined scale of values. Each value may reflect a positive, neutral, or negative health status of a client account. The health index may take into account several key parameters such as a sentiment index 228, a client creditworthiness index, a vendor-services index, and a vendor-device index. A benefit of generating a health index may be to provide a vendor representative with a snap-shot of a client's experience with vendor services. In doing so, a vendor representative may tailor an effective response to a client request by having access to a snap-shot of different facets of a client account. Alternatively, or additionally, a request component 218 may automate a response to client request by having access to the health index and its underlying component indexes.

In a non-limiting example, a client may have a negative sentiment (i.e. sentiment index 228) towards the vendor based on one or more service quality issues (i.e. vendor services index 230). Further the client may be late paying a current invoice (i.e. credit index 234). In response to having access to the above-reference data, a vendor representative may tailor a response that appeases the client's frustration. Thus, the vendor representative, or request component 218, may provide the client with a partial credit towards an outstanding invoice and void a current late payment fee to at least mitigate ongoing vendor service quality issues.

The following examples reflect a non-limiting application of the key index parameters that make up the health index. Each non-limiting example reflects an application of key index parameters to a vendor that engages in telecommunications services. It is noteworthy that the key index parameters may be applied, in a similar vein, to other vendor services, including but not limited to, a sale of any goods or services via an electronic marketplace, or a subscription and membership of services via an electronic marketplace.

The sentiment index 228 may indicate a client view or attitude towards vendor services. Client sentiment may directly relate to a client experience with vendor services, or a general view or attitude towards a vendor service. The sentiment index 228 is intended to capture a current state of a client's attitude that a vendor representative is likely to encounter during a client interaction. The sentiment index 228 may comprise of a numerical value that is based on a predetermined scale of values. Each value may reflect a positive, neutral, or negative client experience with vendor services. Further, incremental changes above or below a neutral value of a sentiment index 228 may respectively reflect incremental changes in a positive or negative client experience.

The sentiment index 228 may be calculated via probabilistic machine learning algorithms that parse historical interactions between a client and vendor representative. Historical interactions may include any form of electronic/digital communication between the client and vendor, such as but not limited to, telephonic correspondence or text-based correspondence via an email service, short messaging service (SMS), multimedia messaging service (MMS), a rich communication service (RCS) platform, or social media messaging platform, etc.

In some examples, audio-based and text-based interactions may be parsed via natural language processing (NLP) and natural language understanding (NLU) algorithms to determine a literal and intended meaning. In doing so, the health index component 222 may determine a context associated with each client interaction, as it relates to sentiment; that is, the health index component 222 may determine an understanding of client sentiment that forms the basis of a client statement. For example, consider a client request for technical support of service quality as it relates to a telecommunications network. The context relating to a client statement such as "why is this still a problem?" may be interpreted as a negative client sentiment.

The health index component 222 may generate a sentiment index 228 by determining an average sentiment score for client interactions associated with a particular client. For example, the health index component 222 may assign a sentiment score to each client interaction. The sentiment score may be a numerical value that is based on a predetermined scale of values. Each value may reflect an incremental grade of positive or negative client interaction. The health index component 222 may then quantify a sentiment index 228 by calculating an average-sum total of sentiment scores associated with each client interaction.

In some cases, the health index component 222 may assign greater weight to more recent client interactions with a vendor representative. Consider an exemplary client that has taken part in three client interactions with a vendor representative. The health index component 222 may determine that two client interactions were negative and a third client interaction was positive. An average-sum total of sentiment scores may suggest that the sentiment index 228 reflect a negative client sentiment. However, if the positive client interaction was weighed more favorably on the basis of it being a more recent client interaction, the sentiment index 228 may reflect a more positive client sentiment.

Additionally, or alternatively, the health index component 222 may generate a sentiment index 228 based on the total number of client interactions that occurs within a predetermined period of time. The purpose of doing so may be to skew the sentiment index 228 towards reflecting client sentiment of more recent client interactions, rather than biasing client sentiment towards a number of historical interactions.

Additionally, the health index component 222 may generate a credit index 234 for each client profile. The credit index 234 may combine normalized credit scores that reflect client-vendor creditworthiness and client-general creditworthiness. A client-vendor creditworthiness score may numerically represent a client history of on-time invoice payments, or alternatively, a client history of late payments. In some examples, the health index component 222 may quantify a client-vendor creditworthiness score by assigning greater weight to more recent client creditworthiness interactions. Alternatively, or additionally, the health index component 222 may base the client-vendor creditworthiness score on a total number of client creditworthiness interactions that occur within a predetermined period of time.

Further, the health index component 222 may quantify a client-general creditworthiness score by interacting with one or more financial credit bureaus to access a credit records associated with the client. The client-general creditworthiness score may be a numerical expression that is based on an analysis of a client's credit files from financial institutions, retail companies, insurance companies, landlords, and government departments.

Upon establishing a client-vendor creditworthiness score and a client-general creditworthiness score, the health index component 222 may normalize each score on a same predetermined scale. Further, the health index component 222 may then generate a credit index 234 by determining a sum-total average of the normalized client-vendor creditworthiness score and client-general creditworthiness score.

Moreover, the health index component 222 may generate a device health index 232. In some examples, a client may be in possession of, or interact with, a client device that facilitates delivery of vendor services. The client device may correspond to client device 106. In this instance, the device health index 232 may reflect an integrity of a client device based at least in part on results from diagnostic tests performed on the client device. The health index component 222 may associate a device health score with the results of each diagnostic test performed on the client device. The device health score may be a numerical value that is based on a predetermined scale of values. Each value may reflect an incremental grade of positive or negative client device health based at least in part on diagnostic test results. The health index component 222 may then quantify a device health index 232 by calculating an average-sum total of device health scores. Further, the health index component 222 may quantify a device health score by assigning greater weight to more recent diagnostic tests results. Alternatively, or additionally, the health index component 222 may base the device heath index on a total number of diagnostic tests performed within a predetermined period of time. In some examples, a diagnostic test may be performed at predetermined intervals to ensure ongoing integrity of a client device. Alternatively, or additionally, a diagnostic check may be performed at a point in time when a client request reports a vendor service issue.

Moreover, the health index component 222 may generate a vendor services index 230. The vendor services index 230 may capture the reliability and quality of vendor services as experienced by a client. The vendor service index may be based on data that is generated from the vendor platform, a client device, or a combination of both. For example, consider a vendor as a service provider of a telecommunications network. A client device may be configured to transmit data that reflects a reliability and quality of telecommunication services experienced by the client device, to the service provider. Thus, the service provider may use such data to derive a vendor services index 230 based on a comparison of the reliability and quality metrics with predetermined threshold metrics. In doing so, the comparison may quantify a quality of communication signal strength experienced by the client device. In another example, a client device may transmit data to the service provider indicating vendor service issues at a current geographic location of the client device. In doing so, the service provider may determine the strength and reliability of the telecommunications network at the geographic location of the client device, and generate a vendor services index 230 based at least in part on the reliability and quality metrics of the vendor services at the geographic location of the client device.

The health index component 222 may associate a vendor services score for each instance that the health index component 222 determines a quality and reliability of vendor services. The vendor services score may be a numerical value that is based on a predetermined scale of values. Each value may reflect an incremental grade of vendor services, varying from a low quality and unreliable service to a high quality and reliable service. The health index component 222 may then quantify a vendor service index by calculating an average-sum total of the vendor services scores. Further, the health index component 222 may assign greater weight to more recent instances of determining vendor service quality and reliability. Alternatively, or additionally, the health index component 222 may base the vendor services index 230 on a total number of instances of determining vendor service quality and reliability that occur within a predetermined period of time.

Additionally, the service automation application 214 may include a technical support component 224 that may remotely initiate diagnostic tests on a client device. The diagnostic tests may quantify a capability of the client device to deliver vendor services. In some examples, the technical support component 224 may remotely cause the client device to execute a diagnostic analysis and transmit results data to the vendor services system. The technical support component 224 may then parse the results data to generate diagnostic test results. In some examples, the diagnostic test results may be used to quantify a device health index 232 for the client device. Further, technical support component 224 may generate data associated with a reliability and quality of vendor services, as experienced by a client device. In doing so, the data may be used to quantify a vendor services index 230 for the client device.

The service automation application 214 may also include a solutions component 220. The solutions component 220 may generate a client response to the client request based at least in part on request data received from the request component 218. The request data may include, but is not limited to, an intended category of vendor services associated with the client request, an intended meaning of the client request, and an urgency index 226 that reflects an urgency of the client request, and an indication of a client account within the vendor platform that is associated with the client request. In various examples, the solutions component 220 may automate a response to fulfill the client request, automate a response to request additional data associated with the client request, or elect to transfer the client request to a vendor representative.

The solutions component 220 may automate a response to a client request or direct the client request to a vendor representative for further processing. In one example, the solutions component 220 may elect to automate a response to a client request based on an availability of support data needed to fulfill the client request. The support data may be stored in a client account within the vendor platform. The support data may include, but is not limited to, diagnostic data associated with a client device or a network service, a current geographic location of the client device, client profile data such as financial data, client account data and vendor service history, or a record of previous client interactions with a vendor platform. For example, consider a client request for help with the functionality of a client device. The solutions component 220 may determine that diagnostic test data associated with the client device may help resolve the client request. Thus, the solutions component 220 may access diagnostic test data associated client device from the client account, and in doing so, transmit a data packet to the client device that dynamically adjusts a product setting of the client device. Product settings may include, but are not limited to, client account settings, operating system settings, network signal strength settings, and data through-put settings.

Alternatively, the solutions component 220 may determine that diagnostic test data is not available in the client account. Thus, the solutions component 220 may cause the technical support component 224 to transmit a data packet to the client device that remotely initiates a diagnostic test on the client device. Once the diagnostic test is complete and in response to receiving diagnostic test results, the solutions component 220 may automate a solution on the client device.

Furthermore, the solutions component 220 may determine that the support data is not available in the client account, and that a client interaction with a vendor representative may capture the support data. Thus, the solutions component 220 may automatically generate and transmit a communication to the client device requesting the support data. Upon receipt of the support data, the solutions component 220 may automate a response to the client request, or alternatively direct the client request to a vendor representative. In a non-limiting example, a client request may involve changing a payment instrument. Thus, the solutions component 220 may automatically generate and transmit a communication to the client device that prompts the client to enter details of the proposed payment instrument. In another non-limiting example, a client request may involve trouble shooting vendor services at a current geographic location of the client device. Thus, the solutions component 220 may automatically generate and transmit a communication to the client device that prompts the client to verify a current geographic location of the client device.

Further, the solutions component 220 may direct the client request to a vendor representative for further processing, because a request for support data may not be easily automated, or a response to the client request requires a balance of factors that is better processed by a vendor representative. For example, consider a client request for a reduction of an outstanding invoice in view of persistent network service outages. In this example, the solutions component 220 may elect to direct the client request to a vendor representative for the purpose of balancing factors such as client creditworthiness and network service reliability. In the event that a client request is directed to a vendor representative, trouble tickets, problem solving instructions, diagnostic data, and other information generated by the solutions component 220 may be made automatically available to the vendor representative.

Additionally, and in response to directing a client request to a vendor representative, the solutions component 220 may select a communication platform for a client interaction with the vendor representative. The communication platform may include one of an audio telecommunications service, an email service, a short messaging service (SMS), a multimedia messaging service (MMS), a rich communication service (RCS) platform, or a social media messaging platform. The selection of a communication platform may be based on one or more factors that include a communication preference, a sentiment index 228 associated with the client, an urgency index 226 associated with the client request, or a category of service associated with the client request. In some examples, a client may indicate a communication preference within a profile of the client account. The communication preference may indicate a preferred communication platform for interactions with the vendor services system. The selection of a preferred communication platform may apply generally to all communications with the vendor platform, which may include automated responses from the vendor services system and client interactions with vendor representatives. Alternatively, a communication preference may apply selectively to a particular category of vendor services. For example, a client may indicate a communication preference for an audio telecommunications platform when dealing with client requests associated with account service support. Alternatively, or additionally, a client may indicate a communication preference for a social media messaging platform when dealing with client requests associated with marketing service support. In these instances, the solutions component 220 may default selection for a client interaction with a vendor representative, to the preferred communication platform.

Additionally, or alternatively, the solutions component 220 may select a communication platform based on the sentiment index 228 of the client. For example, the sentiment index 228 may suggest that the client has a negative view or attitude towards vendor services. Thus, the solutions component 220 may select a real-time interactive communications platform, such as an audio-telecommunications service, for the purpose of engaging the client and improving sentiment.

Further, the solutions component 220 may select a communications platform based on the urgency index 226 of the client request. In some instances, an urgency index 226 may indicate that a client request is urgent and service critical. In these instances, the solutions component 220 may select a real-time interactive communications platform, such as an audio-telecommunications service, for the purpose of expediting a solution that may fulfill the client request. In other instances, an urgency index 226 may indicate that a client request is non-urgent and not service critical. In these instances, the solutions component 220 may select a less interactive communication platform, such as an email service, for a client interaction with a vendor representative.

Moreover, the solutions component 220 may select a communications platform based on a category of vendor services associated with the client request. For example, consider a client request for account services support. The solutions component 220 select an audio-telecommunications service to avoid having client financial data inadvertently disclosed to other parties via a text-based communication platform. Similarly, a client request for marketing services support may be well suited for a text-based communication platform, such as an email service, SMS or MMS service, or a social messaging platform.

In various examples, the solutions component 220 may monitor a client interaction via a communication platform, and selectively provide the vendor representative with relevant support data, as appropriate. The solutions component 220 may monitor and parse audio-based and text-based interactions in real-time using natural language processing (NLP) and natural language understanding (NLU) algorithms. In doing so, the solutions component 220 may determine whether support data that relates to the dialogue of the client interaction, may help the vendor representative resolve the client request. Thus, the solutions component 220 may provide the vendor representative with such support data, based on a literal and intended meaning of dialogue from the client interaction. Support data may include, but is not limited to, diagnostic data associated with a client device, diagnostic data associated with a vendor service, and client data from a client account associated with the vendor platform. Client data may include, but is not limited to, a current geographic location of the client device, a historical record of geographic locations frequented by the client device, client demographic data, client financial data, client user preferences associated with vendor services, a historical record of client interactions with vendor representatives of the vendor platform, a historical record of vendor services used via the client account, and health index data as determined by the health index component 222. Health index data may include a health index 236 along with a sentiment index 228, a device health index 232, a credit index 234, and a vendor services index 230.

In a non-limiting example, consider a client interaction that deals with account services support. In this example, a client may request an adjustment to an outstanding invoice based on a quality and reliability of vendor services. In response to monitoring the client interaction, the solutions component 220 may automatically provide the vendor representative with support data that includes, a device health index 232, a vendor services index 230, and a credit index 234 associated with the client. Thus, by streamlining the availability of support data to the vendor representative, the vendor representative may be more likely to fulfill the client request, efficiently and effectively.

In another non-limiting example, consider a client interaction that deals with vendor service support. In this example, a client may request support for an unreliable vendor services within a current geographic location. In response to monitoring the client interaction, the solutions component 220 may automatically provide the vendor representative with a current geographic location of the client device, along with a device health index 232 and a vendor services index 230.

Moreover, the memory 210 may further include a data store 216 that includes multiple data entries that each correspond to a client of the vendor platform. Each database entry may include client profile data, such as a vendor account identifier, a billing account number (BAN) address, an email address, and a client device identifier. Each database entry may also include data derived from the health index component 222, such as a health index 236, a sentiment index 228, a credit index 234, a device health index 232, and a vendor services index 230. Further, each database entry may include a historical account of client requests along with an accompanying solution(s), and any correspondence with vendor representatives. Additionally, the data store 216 may include data sets of stored images that may be used to help identify image data sent as part of a client request. Each stored image may include metadata that describe the image. The data sets of stored images may include images of persons, client devices, geographic locations associated with vendor services, and vendor hardware associated with vendor services. An example of vendor hardware may include a network communications tower that is associated with a vendor telecommunications service provider.

Figure 3A:
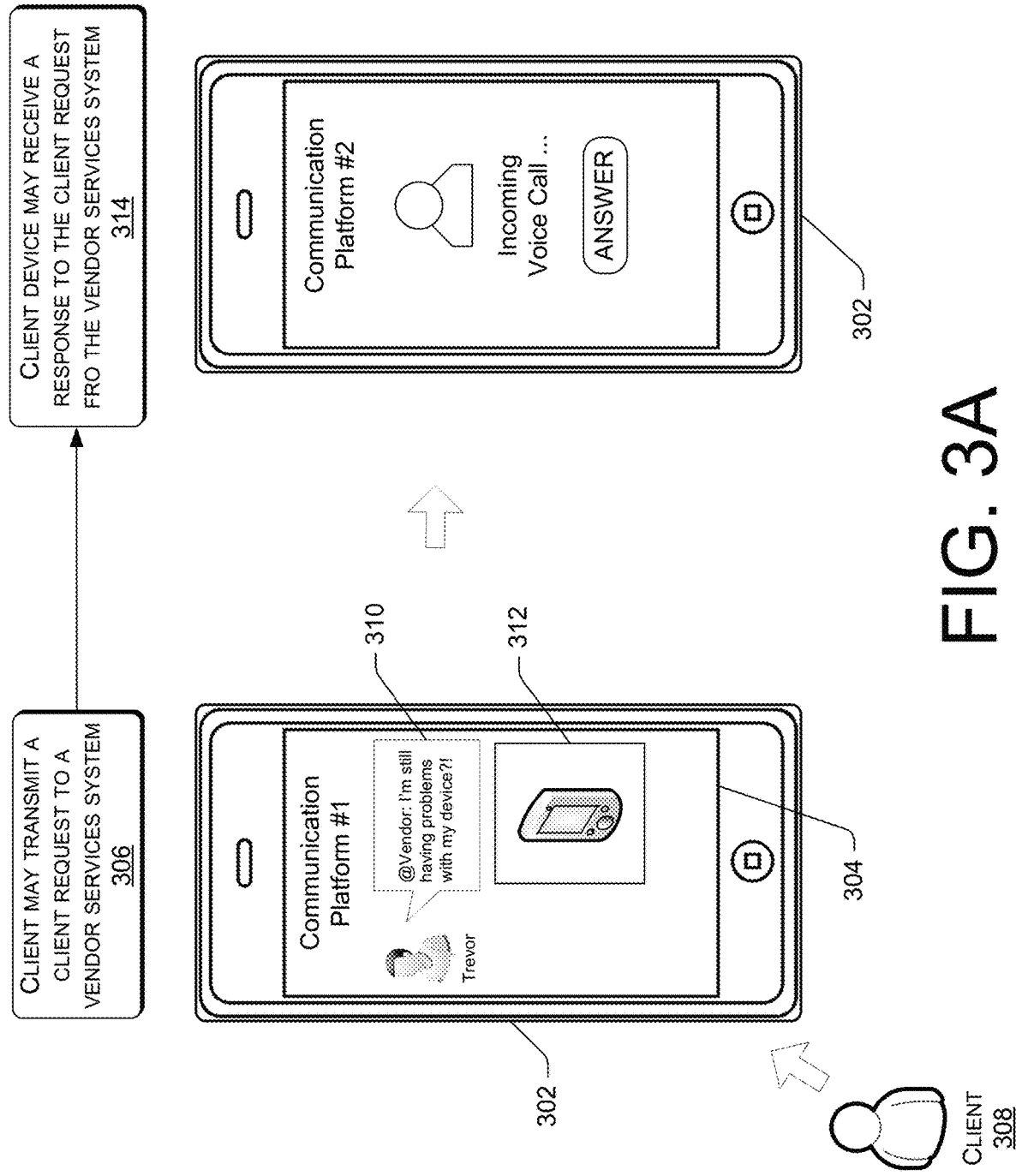
FIGS. 3A and 3B illustrate exemplary user interface(s) of a client device 302 that interacts with the vendor services system.
Figure 3B:
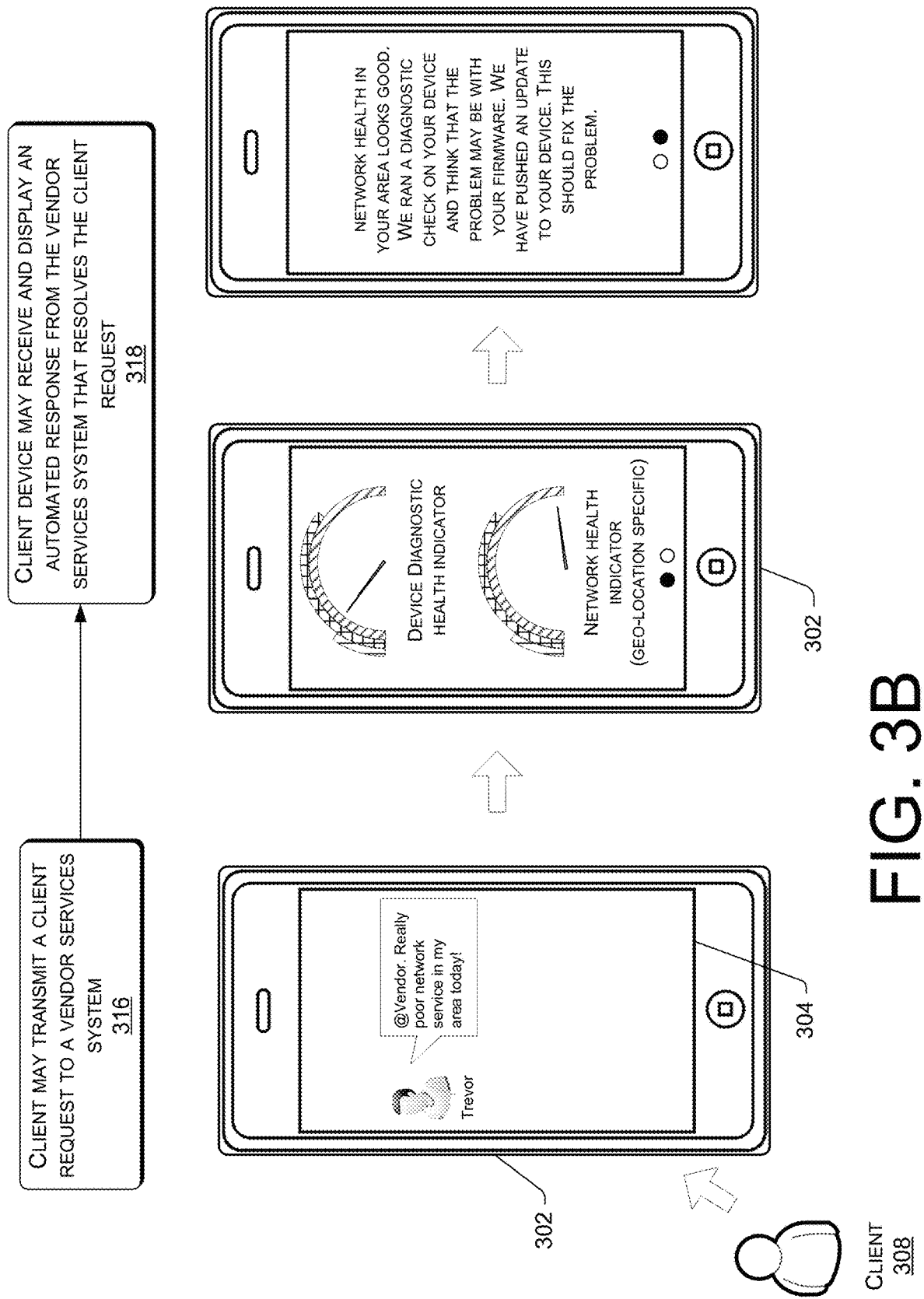

FIGS. 3A and 3B illustrate exemplary user interface(s) of a client device 302 that interacts with the vendor services system. FIG. 3A illustrates a user interface 304 of a client device 302 that facilitates transmission of a client request and receipt of an automated response from a vendor services system. At block 306, a client 308 may direct a client request to a vendor services system, via the user interface 304. The client request may include text data 310, image data 312, audio data, or any combination thereof. In the illustrated example, the client request includes text data 310 that indicates "a problem with a device" along with image data 312 of a device. The client request may be transmitted to the vendor services system via a first communication platform that is capable of transmitting such data. The first communication platform may correspond to one of an MMS platform, a RCS platform, an email service platform, or a social media messaging platform.

At block 314, the client device 302 may receive, via the user interface 304, a response to the client request from the vendor services system. In this example, the response may comprise of the vendor services system remotely initiating a client interaction between the client 308, via the user interface 304, and a vendor representative.

FIG. 3B illustrates a user interface 304 of a client device 302 that facilitates transmission of a client request and receipt of an automated response from a vendor services system. At block 316, the client 308 may transmit a client request to a vendor services system. The client request may include text data, image data, audio data, or any combination thereof. In the illustrated example, the client request comprises of text data that highlights "poor network service," and is transmitted via a communication platform capable of transmitting such data. At block 318, the client device 302 may receive and display, via the user interface 304, an automated response from the vendor services system that resolves the client request. The response may include an analysis and summary of a probable cause of the "poor network service," as well as an automated solution performed by the vendor services system.

Figure 3C:
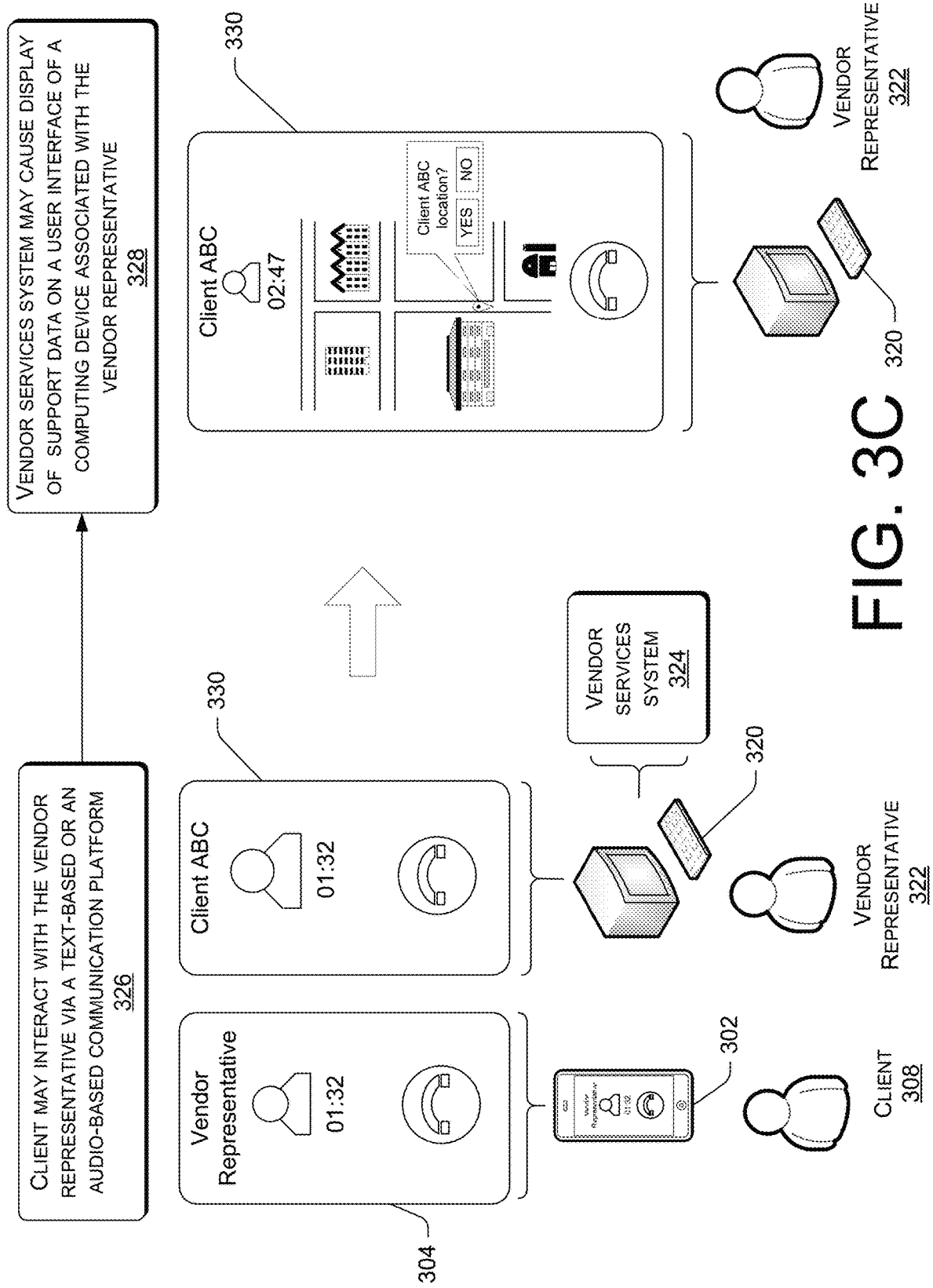
FIG. 3C illustrates an exemplary user interface of a vendor representative computing device that displays support data during a client interaction, that is provisioned by the vendor services system during a client interaction.

FIG. 3C illustrates an exemplary user interface of a computing device 320 of a vendor representative 322 that displays support data associated with a client request, during a client interaction. In this example, the vendor services system 324 may generate and provide support data to a computing device 320 of a vendor representative 322 based at least in part on an analysis of a real-time client interaction. At block 326, the client 308 may interact with the vendor representative 322 via a text-based or audio-based communication platform. In the illustrated example, the client interaction occurs via an audio telecommunication service. In doing so, the vendor services system 324 may monitor and parse audio data and text data associated with dialogue of the client interaction, in real-time, using NLP and NLU algorithms.

At block 328, the vendor services system 324 may cause the display of support data on a user interface 330 of a computing device 320 associated with the vendor representative 322. Particularly, the vendor services system 324 may identify support data that may help the vendor representative 322 resolve the client request, based at least in part on the audio data or text data that is monitored during the client interaction. In some examples, the vendor services system 324 may automatically retrieve and present the support data on a computing device 320 of the vendor representative 322. In a non-limiting example, the vendor services system 324 may present the geographic location of a client device 302 to the computing device 320 of the vendor representative 322, in response to determining from the client interaction that the client 308 is having problems with vendor services at their current location.

Figure 4:
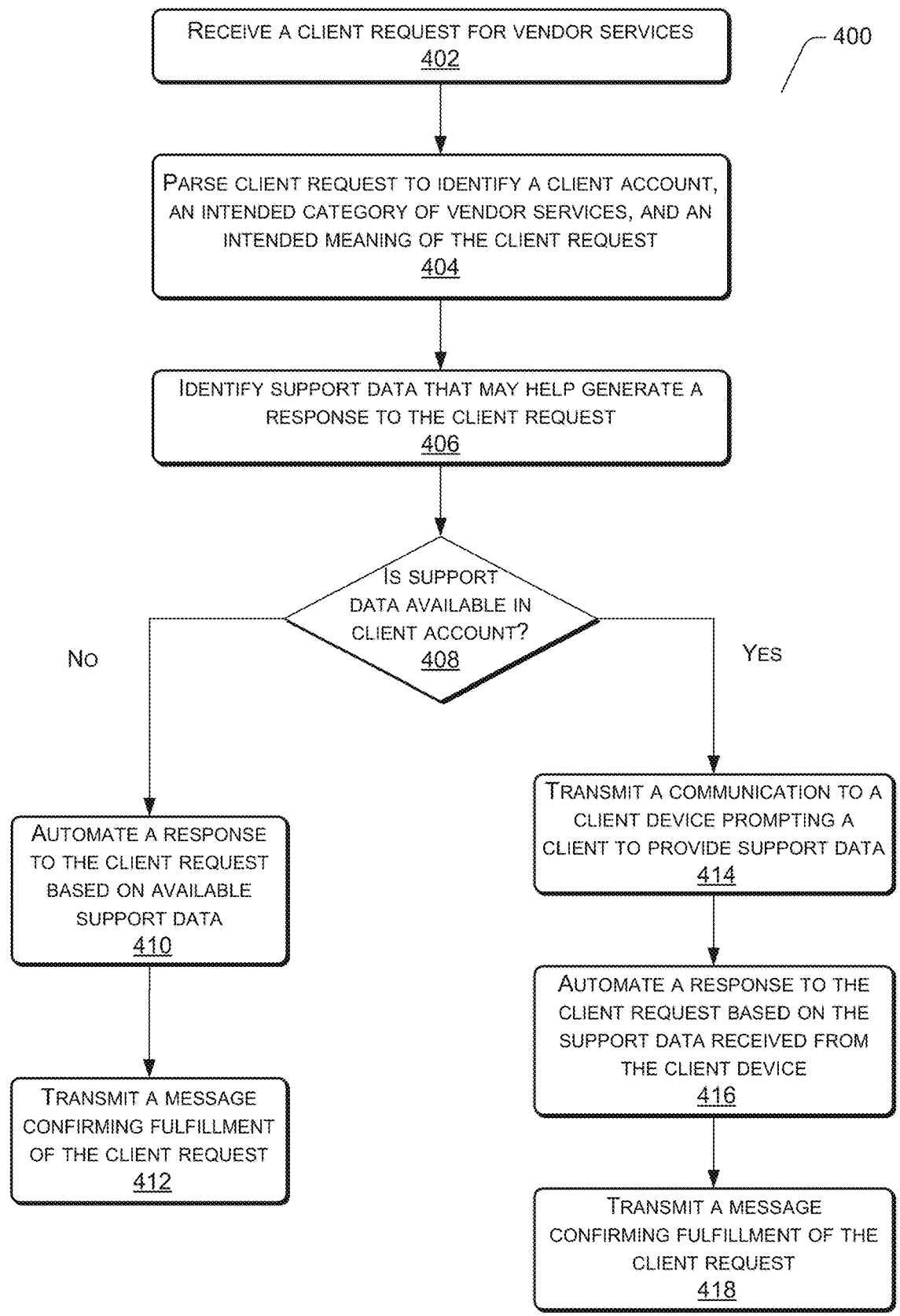
FIG. 4 illustrates a vendor services system process for performing one or more actions that fulfill a client request for vendor services.
Figure 5:
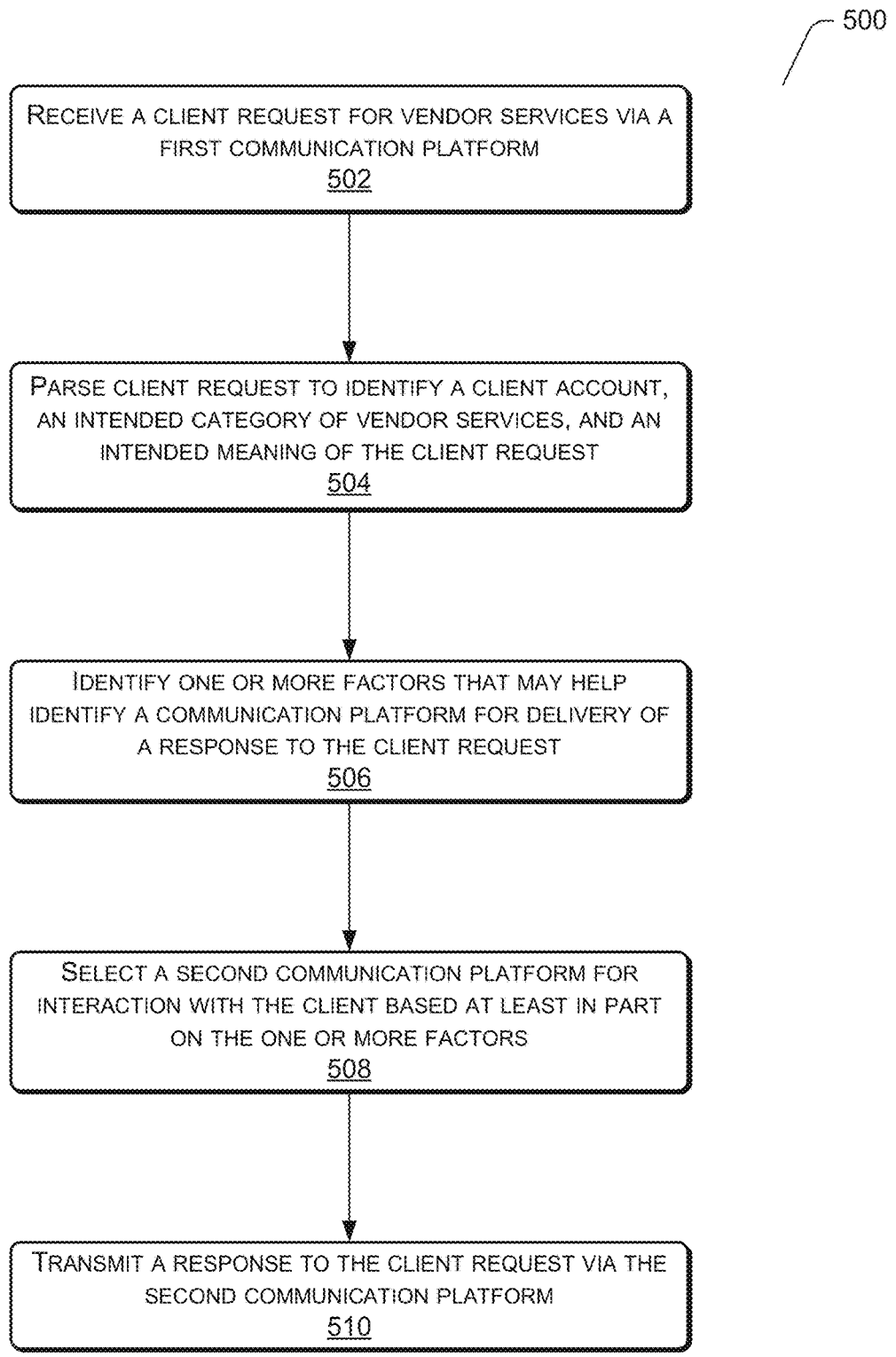
FIG. 5 illustrates a vendor services system process for selecting a communication platform for delivery of a response to a client request.
Figure 6:
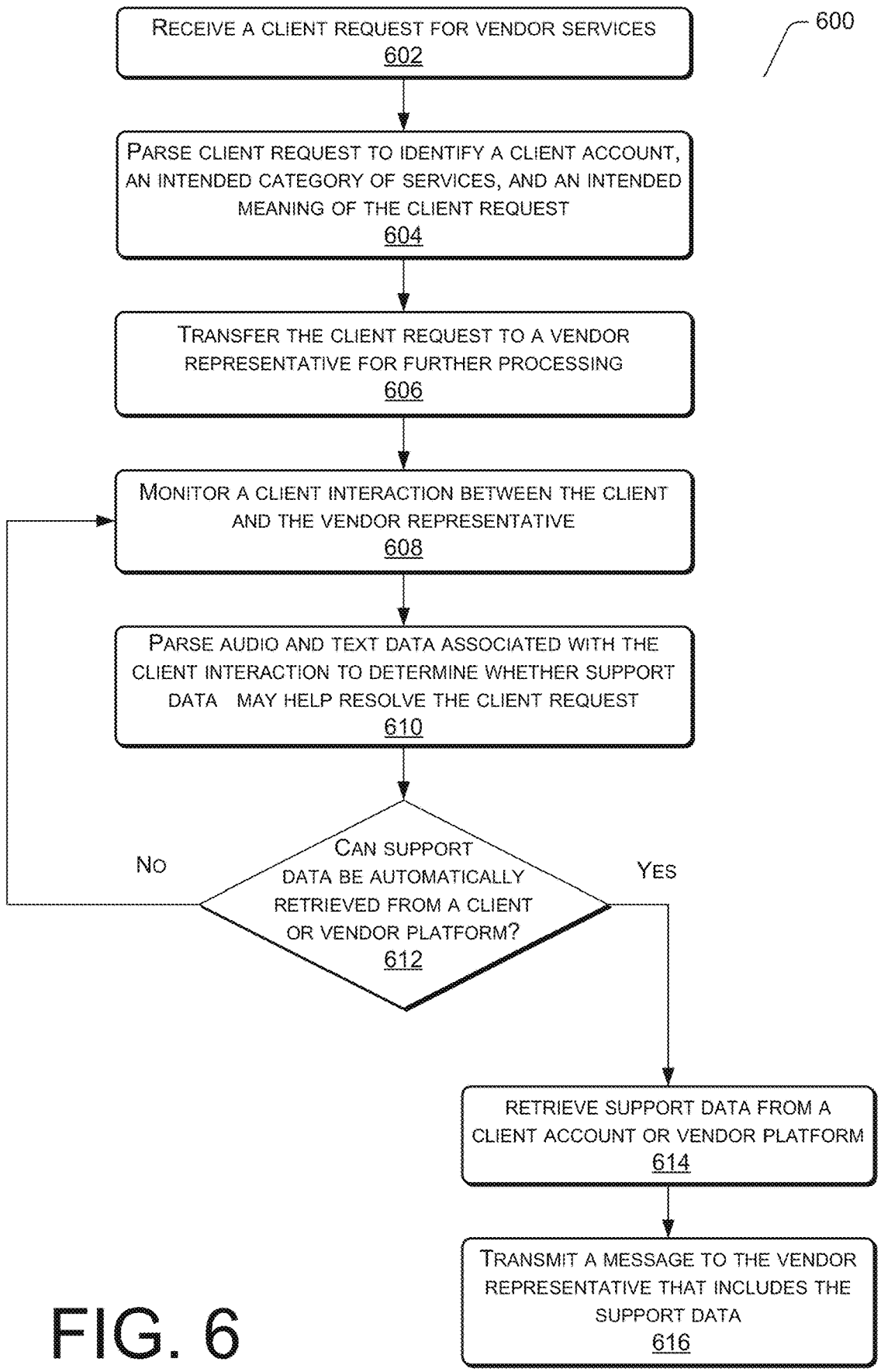
FIG. 6 illustrates a vendor services system process for monitoring a client interaction with a vendor representative and selectively providing the vendor representative with support data that relates to the client request.

FIGS. 4, 5, and 6 present processes 400, 500, and 600 that relate to operations of the vendor services system, and more specifically the service automation application. Each of processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the computing environment 100 of FIG. 1.

FIG. 4 illustrates a vendor services system process for performing one or more actions that fulfill a client request for vendor services. In some examples, the vendor services system may automate performance of the one or more actions. In other examples, the vendor services system may request support data for fulfillment of the client request. The support data may include, but is not limited to, diagnostic data associated with a client device or a network service, a current geographic location of the client device, client profile data such as financial data, client account data and vendor service history, or a record of previous client interactions with a vendor platform.

At 402, the vendor services system may receive a client request for vendor services. The client request may comprise of audio data, text data, image data, or any combination thereof. Further, the vendor services system may receive the client request via one of an email service, a short message service (SMS), a multimedia messaging service (MMS), a rich communication service (RCS) platform, or a social media messaging platform.

At 404, the vendor services system may parse the client request via NLP and NLU algorithms to identify a client account associated with the client request, an intended category of vendor services associated with the client request, and an intended meaning of the client request. For example, a client request may state "my phone is not working." The vendor services system may parse the client request to identify an associated client account, determine that the category of vendor services is "technical service support," and determine that the intended meaning of the client request is "assistance with client device functionality."

At 406, the vendor services system may identify support data that may help generate a response to the client request, based at least in part on the intended meaning of the client request. In some examples, the support data may include diagnostic data associated with a client device or a network service, or a current geographic location of the client device.

At 408, the vendor services system may determine whether support data that is related to the client request is available in the client account. The support data may include, but is not limited to, diagnostic data associated with a client device or a network service, a current geographic location of the client device, client profile data such as financial data, client account data and vendor service history, or a record of previous client interactions with a vendor platform.

At 410, the vendor services system may determine that the support data is available in the client account. In doing so, the vendor services system may automate a response to the client request based at least in part on the support data. For example, a client request may seek assistance with client device functionality. Thus, the vendor services system may access diagnostic test data associated with the client device from the client account, and in doing so, transmit a data packet to the client device that dynamically adjusts a product setting of the client device.

At 412, the vendor services system may transmit a message to the client device that confirms fulfillment of the client request. The message may include information describing the automated solution as performed by the vendor services system.

At 414, the vendor services system may determine that the support data is not available in the client account. Thus, the vendor services system may transmit a communication to the client device that prompts the client to provide the support data. Continuing with the previous example, the vendor services system may request that a client confirm a current geographic location of the client device. This may help the vendor services system determine a root cause of client device functionality issues.

At 416, the vendor services system may automate a response to the client request based at least in part on the support data received from the client device. Further, the response may be based on a combination of support data within the client account and the support data received from the client device.

At 418, the vendor services system may transmit a message to the client device that confirms fulfillment of the client request. The message may include information describing the automated solution as performed by the vendor services system.

FIG. 5 illustrates a vendor services system process for selecting a communication platform for delivery of a response to a client request. The communication platform may include one of an audio telecommunications service, an email service, a short messaging service (SMS), a multimedia messaging service (MMS), a rich communication service (RCS) platform, or a social media messaging platform.

At 502, the vendor services system may receive a client request for vendor services. The client request may be delivered via a first communication platform, and may comprise of audio data, text data, image data, or any combination thereof.

At 504, the vendor services system may parse the client request via NLP and NLU algorithms to identify at least a client account associated with the client request, an intended category of vendor services associated with the client request, and an intended meaning of the client request.

At 506, the vendor services system may identify one or more factors that may help identify a communication platform for delivery of a response to the client request. The one or more factors may include a communication preference, a sentiment index associated with the client, an urgency index associated with the client request, or a category of service associated with the client request. In a non-limiting example, a client request may seek assistance with adjusting the balance of an outstanding invoice. Further, the client account from step 504 may include a communication preference that indicates a preferred communication platform for client interactions. In some examples, a preferred communication platform may apply generally to all client interactions with vendor representatives. Alternatively, a communication preference may selectively identify a preferred communication platform for a particular category of vendor services.

At 508, the vendor services system may select a second communication platform for interaction with the client based at least in part on the one or more factors. In some examples, the vendor services system may effectuate the second communication platform via the client device itself, or another device that is different from the client device, such as a telephone or computing device. The second communication platform may be substantially similar to the first communication platform. Alternatively, the second communication platform may be different to the first communication platform.

At 510, the vendor services system may transmit a response to the client request via the second communication platform. The vendor services system may automate the response via the second communication platform. Alternatively, a vendor representative may effectuate a response via the second communication platform.

FIG. 6 illustrates a vendor services system process for monitoring a client interaction with a vendor representative and selectively providing the vendor representative with support data that relates to the client request. The vendor services system may monitor and parse audio-based and text-based interactions in real-time using NLP and NLU algorithms.

At 602, the vendor services system may receive a client request for vendor services. The client request may be delivered via a first communication platform, and may comprise of audio data, text data, image data, or any combination thereof.

At 604, the vendor services system may parse through the client request via NLP and NLU algorithms to identify at least a client account associated with the client request, an intended category of vendor services associated with the client request, and an intended meaning of the client request.

At 606, the vendor services system may transfer a client request to a vendor representative for further processing. The vendor services system may determine that a response to the client request involves balancing one or more factors, the balancing of which is best performed by a vendor representative rather than the vendor services system. For example, consider a client request for a reduction of an outstanding invoice because of persistent network service outages. In this example, the vendor services system may elect to transfer the client request to a vendor representative for the purpose of balancing factors such as client creditworthiness and network service performance.

At 608, the vendor services system may monitor the client interaction between the client and the vendor representative. In various examples, the client interaction may occur via a communication platform that may include an audio telecommunications service, an email service, a short messaging service (SMS), a multimedia messaging service (MMS), a rich communication service (RCS) platform, or a social media messaging platform.

At 610, the vendor services system may parse audio data and text data associated with the client interaction, in real-time, using NLP and NLU algorithms. In doing so, the vendor services system may determine whether support data that relates to dialogue of the client interaction may help the vendor representative resolve the client request. For example, dialogue of the client interaction may center around the functionality of a client device. Thus, the vendor services system may determine that diagnostic test data associated with the client device may help the vendor representative resolve the client request.

At 612, the vendor services system may determine whether support data that relates to the client request can be automatically retrieved from a client account or the vendor platform. The support data may include, but is not limited to, diagnostic data associated with a client device or a network service, a current geographic location of the client device, client profile data such as financial data, client account data and vendor service history, or a record of previous client interactions with a vendor platform.

At 614, the vendor services system may determine that the support data identified from dialogue of the client interaction may be automatically retrieved from a client account, or the vendor platform. Continuing with the above example, the vendor services system may retrieve diagnostic test data of the client device, from a client account associated with the client request. Alternatively, or additionally, the vendor services system may determine a geographic location of the client device based on data within the client account, or via global positioning system (GPS) capabilities within the vendor platform.

Further, the vendor services system may determine that the support data identified from dialogue of the client interaction cannot be automatically retrieved from a client account or the vendor platform. In this instance, the vendor services system may continue to monitor the client interaction for other support data that may be automatically retrieved.

At 616, the vendor services system may transmit a message to the vendor representative that includes the support data. The support data may be displayed on a user interface of a computing device used by the vendor representative while the client interaction is ongoing.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. One or more non-transitory computer-readable media storing computer-executable instructions, that when executed on one or more processors, causes the one or more processors to perform acts comprising:
   receiving, by a vendor device via a first communication platform, a first request that is associated with a network service issue impacting a client device and that is associated with a client account with the vendor;
   determining, by the vendor device and for the user of the client device, a client-vendor creditworthiness score that represents a history of invoice payment timeliness;
   determining, by the vendor device and for the user, a client-general creditworthiness score based on an analysis of the user's credit files from financial institutions, retail companies, insurance companies, landlords, and government departments;
   determining, by the vendor device, a credit index for the user based on the client-vendor creditworthiness score and the client-general creditworthiness score;
   based in part on the first request, determining, by the vendor device, support data that is associated with the client device and that includes the credit index;
   determining, by the vendor device, that the support data does not include data necessary to determine a cause of the network service issue;
   based on determining that the support data does not include the data necessary to determine the cause of the network issue, generating, by the vendor device, a second request for the data necessary to determine a cause of the network service issue;
   based on the support data that is associated with the client device and that includes the credit index, determining, by the vendor device, a second communication platform for transmitting the second request from the vendor device to the client device;
   providing, for output by the vendor device and to the client device via the second communication platform, the second request;
   in response to the second request, receiving, by the vendor device and from the client device, the data necessary to determine a cause of the network service issue; and
   based on the support data and the data necessary to determine a cause of the network service issue, determining, by the vendor device, the cause of the network service issue.

2. The one or more non-transitory computer-readable media of claim 1, wherein the acts comprise:
   determining, by the vendor device, an action that corrects the cause of the network issue;
   performing, by the vendor device, the action that corrects the cause of the network issue; and
   in response to performing the action that corrects the cause of the network issue, providing, for output by the vendor device and to the client device, data indicating correction of the network issue.

3. The one or more non-transitory computer-readable media of claim 1, wherein the acts comprise:
   determining, by the vendor device, a third communication platform for transmitting the data indicating correction of the network issue,
   wherein providing, for output, the data indicating correction of the network issue is via the third communication platform.

4. The one or more non-transitory computer-readable media of claim 1, wherein the support data associated with the client device includes one or more of a category of vendor service, a device health index that reflects an integrity of the client device, an urgency index that reflects a period of time within which to address the first request, and a sentiment index that reflects a state of an attitude of a user of the client device towards the vendor.

5. The one or more non-transitory computer-readable media of claim 1, wherein the second request for the data necessary to determine a cause of the network service issue comprises a prompt for a user of the client device to provide the data necessary to determine a cause of the network service issue.

6. A system comprising:
   one or more processors; and
   memory coupled to the one or more processors, the memory including one or more modules that are executable by the one or more processors to:
      receive, by a vendor device via a first communication platform, a first request that is associated with a network service issue impacting a client device and that is associated with a client account with the vendor;
      determine, by the vendor device and for the user of the client device, a client-vendor creditworthiness score that represents a history of invoice payment timeliness;
      determine, by the vendor device and for the user, a client-general creditworthiness score based on an analysis of the user's credit files from financial institutions, retail companies, insurance companies, landlords, and government departments;
      determine, by the vendor device, a credit index for the user based on the client-vendor creditworthiness score and the client-general creditworthiness score;
      based in part on the first request, determine, by the vendor device, support data that is associated with the client device and that includes the credit index;
      determine, by the vendor device, that the support data does not include data necessary to determine a cause of the network service issue;
      based on determining that the support data does not include the data necessary to determine the cause of the network issue, generate, by the vendor device, a second request for the data necessary to determine a cause of the network service issue;
      based on the support data that is associated with the client device and that includes the credit index, determine, by the vendor device, a second communication platform for transmitting the second request from the vendor device to the client device;
      provide, for output by the vendor device and to the client device via the second communication platform, the second request;

in response to the second request, receive, by the vendor device and from the client device, the data necessary to determine a cause of the network service issue; and based on the support data and the data necessary to determine a cause of the network service issue, determine, by the vendor device, the cause of the network service issue.

7. The system of claim 6, wherein the one or more modules are further executable by the one or more processors to:

determine, by the vendor device, an action that corrects the cause of the network issue;

perform, by the vendor device, the action that corrects the cause of the network issue; and in response to performing the action that corrects the cause of the network issue, provide, for output by the vendor device and to the client device, data indicating correction of the network issue.

8. The system of claim 6, wherein the one or more modules are further executable by the one or more processors to:

determine, by the vendor device, a third communication platform for transmitting the data indicating correction of the network issue, wherein providing, for output, the data indicating correction of the network issue is via the third communication platform.

9. The system of claim 6, wherein the support data associated with the client device includes one or more of a category of vendor service, a device health index that reflects an integrity of the client device, an urgency index that reflects a period of time within which to address the first request, and a sentiment index that reflects a state of an attitude of a user of the client device towards the vendor.

10. The system of claim 6, wherein the second request for the data necessary to determine a cause of the network service issue comprises a prompt for a user of the client device to provide the data necessary to determine a cause of the network service issue.

11. A computer-implemented method, comprising:

receiving, by a vendor device via a first communication platform, a first request that is associated with a network service issue impacting a client device and that is associated with a client account with the vendor;

determining, by the vendor device and for the user of the client device, a client-vendor creditworthiness score that represents a history of invoice payment timeliness;

determining, by the vendor device and for the user, a client-general creditworthiness score based on an analysis of the user's credit files from financial institutions, retail companies, insurance companies, landlords, and government departments;

determining, by the vendor device, a credit index for the user based on the client-vendor creditworthiness score and the client-general creditworthiness score;

based in part on the first request, determining, by the vendor device, support data that is associated with the client device and that includes the credit index;

determining, by the vendor device, that the support data does not include data necessary to determine a cause of the network service issue;

based on determining that the support data does not include the data necessary to determine the cause of the network issue, generating, by the vendor device, a second request for the data necessary to determine a cause of the network service issue;

based on the support data that is associated with the client device and that includes the credit index, determining, by the vendor device, a second communication platform for transmitting the second request from the vendor device to the client device;

providing, for output by the vendor device and to the client device via the second communication platform, the second request;

in response to the second request, receiving, by the vendor device and from the client device, the data necessary to determine a cause of the network service issue; and based on the support data and the data necessary to determine a cause of the network service issue, determining, by the vendor device, the cause of the network service issue.

12. The computer-implemented method of claim 11, comprising:

determining, by the vendor device, an action that corrects the cause of the network issue;

performing, by the vendor device, the action that corrects the cause of the network issue; and in response to performing the action that corrects the cause of the network issue, providing, for output by the vendor device and to the client device, data indicating correction of the network issue.

13. The computer-implemented method of claim 11, comprising:

determining, by the vendor device, a third communication platform for transmitting the data indicating correction of the network issue, wherein providing, for output, the data indicating correction of the network issue is via the third communication platform.

14. The computer-implemented method of claim 11, wherein the support data associated with the client device includes one or more of a category of vendor service, a device health index that reflects an integrity of the client device, an urgency index that reflects a period of time within which to address the first request, and a sentiment index that reflects a state of an attitude of a user of the client device towards the vendor.

15. The computer-implemented method of claim 11, wherein:

the second request for the data necessary to determine a cause of the network service issue comprises a prompt for a user of the client device to provide the data necessary to determine a cause of the network service issue, and determining the second communication platform for transmitting the second request from the vendor device to the client device is based on the support data.

* * * * *